United States Patent
Markland

[11] 3,768,454
[45] Oct. 30, 1973

[54] FUEL HEATER
[75] Inventor: Richard D. Markland, Menlo Park, Calif.
[73] Assignee: Consolidated Metco, Inc., Portland, Oreg.
[22] Filed: July 6, 1971
[21] Appl. No.: 159,712

[52] U.S. Cl.............................. 123/122 E, 123/136 R
[51] Int. Cl...................... F02m 31/14, F02m 59/00
[58] Field of Search........................ 123/122 E, 136

[56] References Cited
UNITED STATES PATENTS

| | | | |
|---|---|---|---|
| 2,881,828 | 4/1959 | McGinnis | 123/122 E |
| 3,489,128 | 1/1970 | Ainger | 123/136 |
| 3,893,694 | 7/1971 | Hilborn | 123/136 |
| 3,628,516 | 12/1971 | Perrin | 123/136 |
| 3,472,214 | 10/1969 | Moon | 123/122 |

Primary Examiner—Laurence M. Goodridge
Assistant Examiner—Ronald B. Cox
Attorney—Buckhorn, Blore, Klarquist & Sparkman

[57] ABSTRACT

One diesel heat mixer (FIGS. 1-3) has a temperature responsive flow divider valve positioned between fuel tanks and an engine and responsive to temperature of fuel being supplied to the engine by a feed line mixed with fuel returned from the engine. The valve divides heated fuel from a return line from the engine to direct the flow either to the tanks or the feed line, which is also supplied with cool fuel from the tanks and leads from the valve to the engine. A second diesel heat mixer (FIGS. 4-7) has a mixing zone defined by two baffles in a fuel tank, and fuel to an engine is drawn from a standpipe unit in the mixing zone, a temperature responsive valve serving to divide heated fuel from a return line from the engine between the mixing zone and a bypass line feeding fuel to a second tank connected to the first tank, the proportions flowing to each being controlled by the temperature of fuel supplied from the mixing zone. The standpipe unit has a mounting plate covering an opening in the tank, and the mounting plate carries a standpipe and a return tube directing returned, heated fuel away from the entrance end of the standpipe. A third diesel heat mixer has a reversible fuel tank having a baffle near one end to form a confined mixing zone to which heated fuel is supplied by a return line and from which mixed fuel is removed. Each of the valves has a heat expansible unit engaging one end of a spring-pressed spool and positioned in a passage from the tanks to the feed line.

6 Claims, 11 Drawing Figures

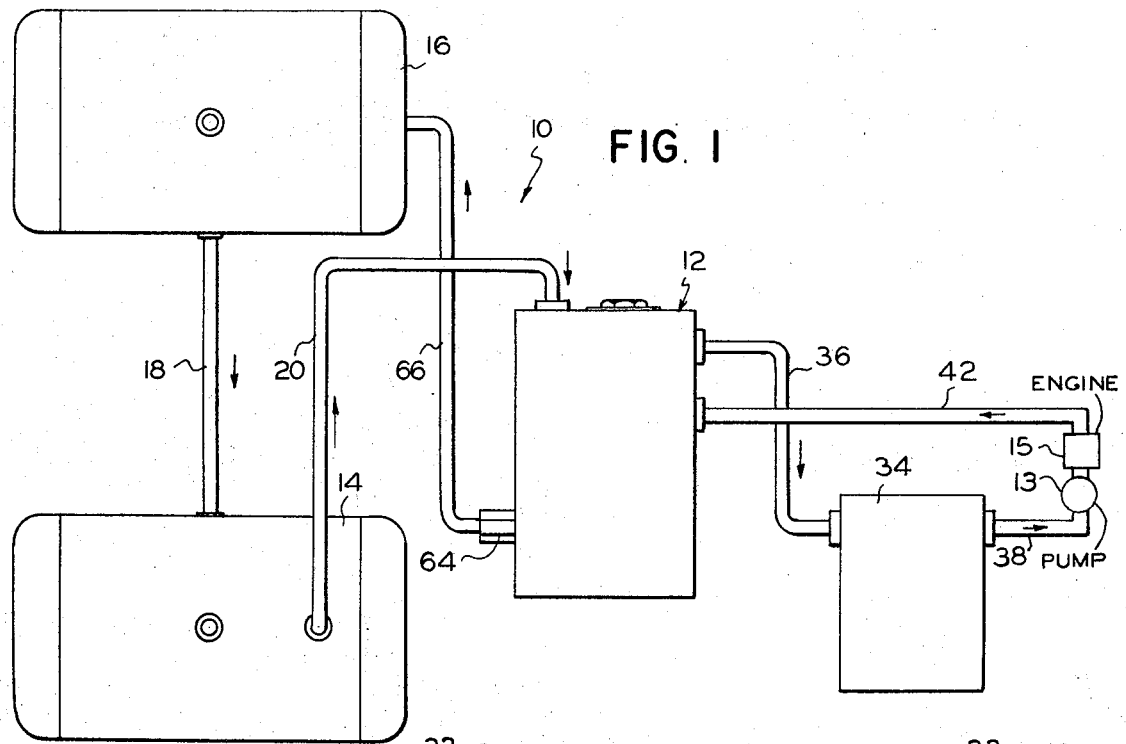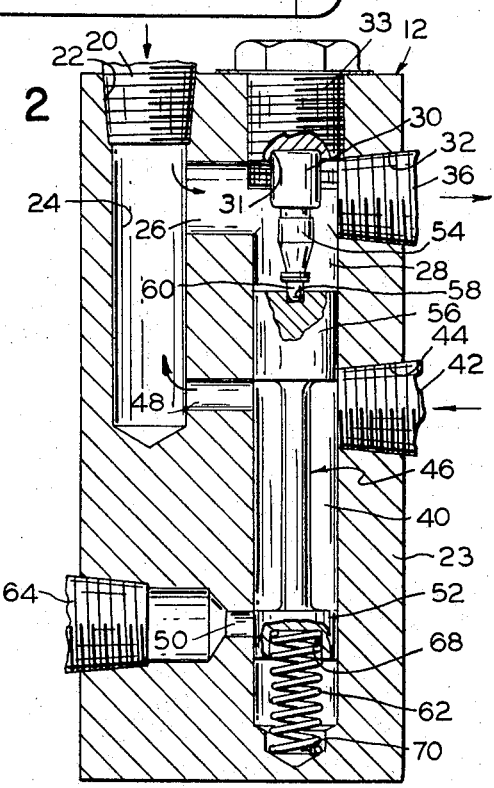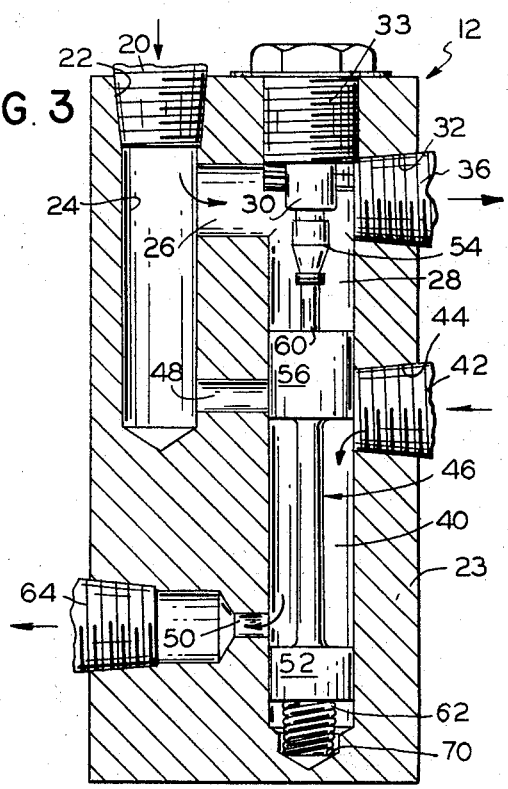

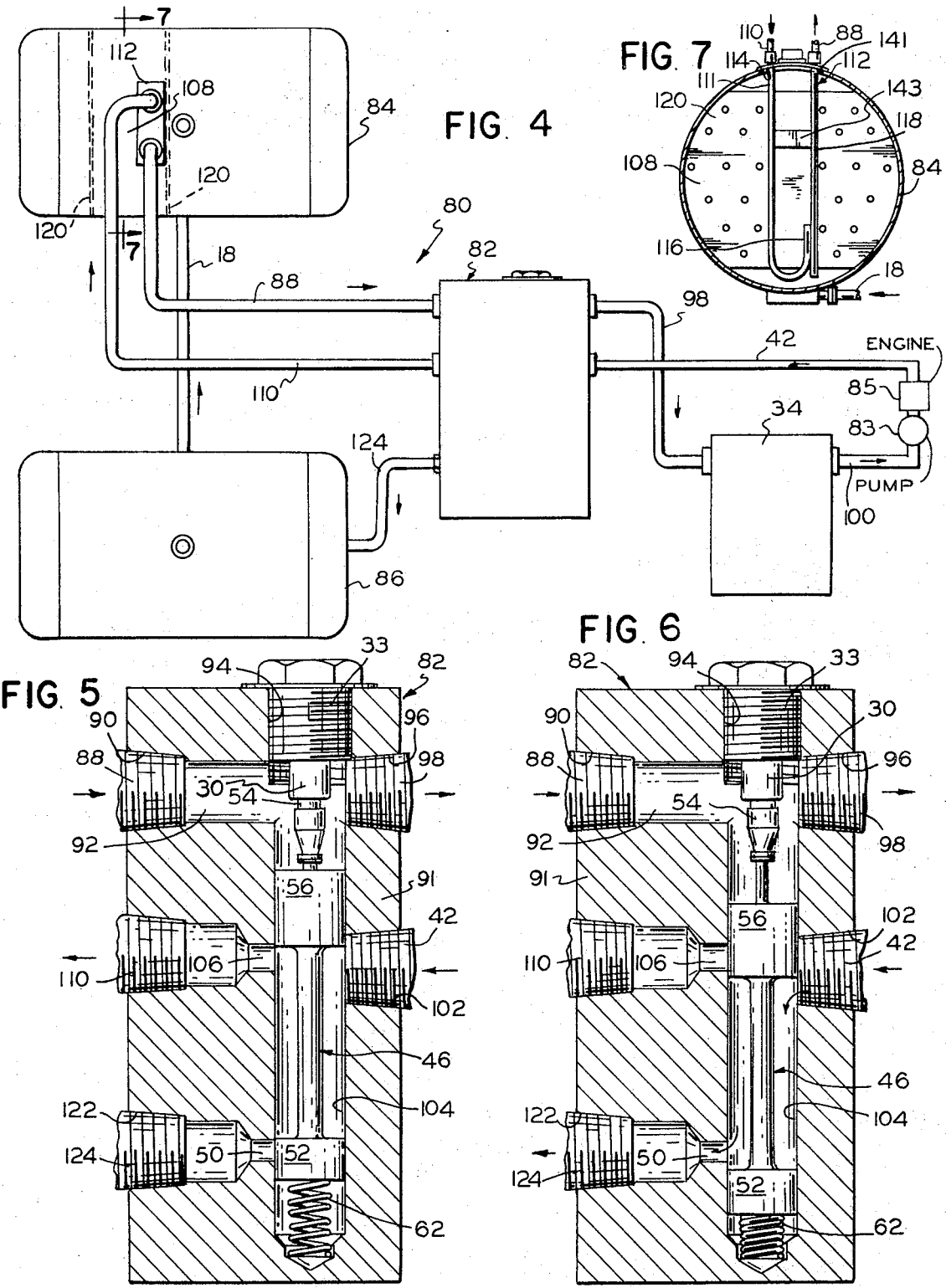

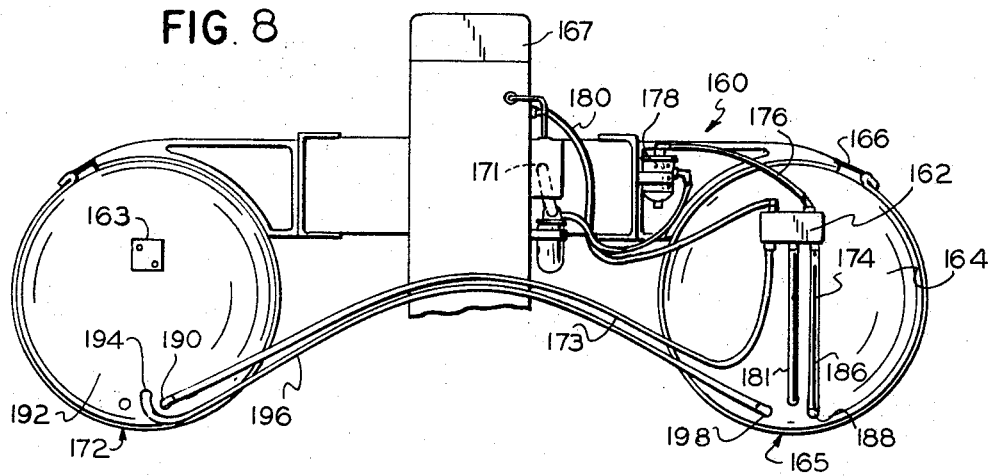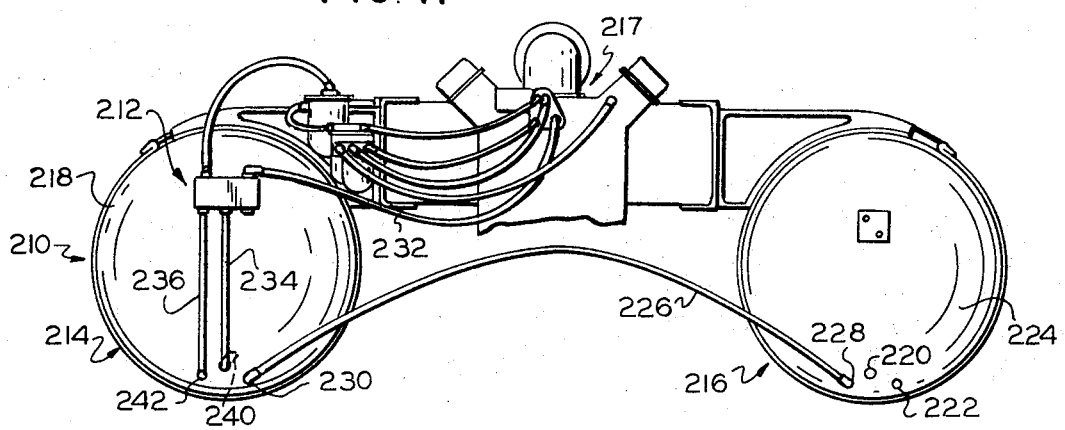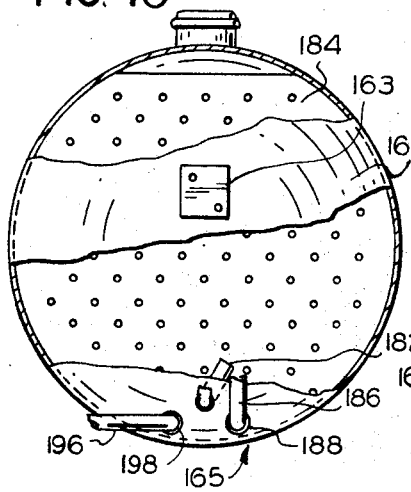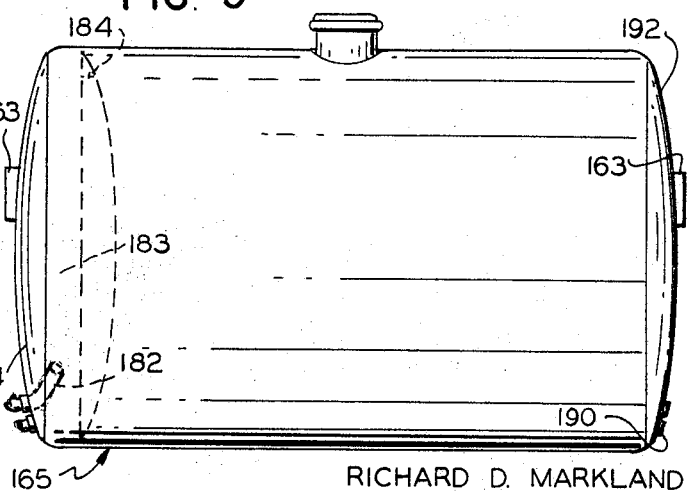

FUEL HEATER

DESCRIPTION

This invention relates to new and improved diesel heat mixers, and more particularly to new and improved systems for heating fuel supplied to diesel engines.

An object of the invention is to provide new and improved diesel heat mixers.

Another object of the invention is to provide new and improved systems for heating fuel supplied to diesel engines.

A further object of the invention is to provide inexpensive, effective diesel fuel mixers easily installed in existing truck tractors.

Another object of the invention is to provide diesel heat mixers each having a single temperature responsive valve unit which divides flow of heated fuel from a return line from an engine in accordance with the temperature of fuel fed to the engine.

Another object of the invention is to provide systems for heating diesel fuel for engines in each of which systems only a single temperature responsive flow dividing valve is required.

Another object of the invention is to provide unitary temperature responsive flow dividing valves, each of which valves is adapted to adjust in accordance with the temperature of fuel fed to an engine and to add heated fuel to the fuel being fed to the engine in accordance with that temperature.

Another object of the invention is to provide diesel heat mixer valves, each having a valve body in which is mounted a spring-pressed, flow dividing spool positioned by a heat expansible unit positioned in a feed line passage through the valve body.

Another object of the invention is to provide a diesel heat mixer having a standpipe unit positioned at a confined mixing zone in a fuel tank and having a mounting plate covering an opening in the tank and carrying a standpipe having an inlet end near the bottom of the tank and also carrying a return pipe having an exit directed away from the inlet end of the standpipe.

In the drawings:

FIG. 1 is a fragmentary schematic view of a diesel heat mixer forming one embodiment of the invention FIG. 2 is a vertical sectional view of a flow divider of the diesel heat mixer of FIG. 1 in a condition for maximum heating;

FIG. 3 is a view like FIG. 2 but with the flow divider in a condition for minimum heating;

FIG. 4 is a fragmentary schematic view of a diesel heat mixer forming an alternate embodiment of the invention;

FIG. 5 is a vertical sectional view of a flow divider of the diesel heat mixer of FIG. 4 in a condition for maximum fuel heating;

FIG. 6 is a view like FIG. 5 but with the flow divider in a condition for minimum fuel heating;

FIG. 7 is a vertical sectional view taken along line 7—7 of FIG. 4;

FIG. 8 is a fragmentary end view of a diesel heat mixer forming an alternate embodiment of the invention and a diesel engine;

FIG. 9 is a partially sectional end view of a fuel tank of the mixer of FIG. 8;

FIG. 10 is a side elevation view of the fuel tank of FIG. 9; and

FIG. 11 is a fragmentary end view of a diesel heat mixer forming an alternate embodiment of the invention and a diesel engine.

Referring now in detail to the drawings, there is shown in FIGS. 1 to 3 a diesel heat mixer 10 forming one embodiment of the invention and adapted to rapidly raise the temperature of engine infeed fuel oil to normal operating level, and maintain it there by a temperature responsive flow divider valve 12. A fuel pump 13 of an engine 15 draws diesel fuel from a truck tractor mounted tank 14 connected to a similar tank 16 by a crossover pipe 18. These tanks are bracketed in the normal manner on a truck tractor (not shown). The fuel passes from the tank 14 through a supply line 20 to a supply port 22 in a valve body 23 of the flow divider valve 12, and from the port 22 through a mixing zone bore 24. The fuel flows from the bore 24 through a horizontal bore 26, across an intersecting vertical bore 28, the intersection of the bores 26 and 28 defining a thermostat chamber, and out through port 32 to a fuel and water separator 34 by way of a feed line 36. A temperature responsive unit or thermostat 30 seated in a socket 31 of a plug 33 is positioned in the thermostat chamber. The separator 34 removes moisture from the fuel.

The fuel pump 13 applies suction to the feed line through the separator by way of line 38. The fuel pump 13 pumps an excess amount of fuel (roughly about five times that required) into a distribution chamber in the engine 15 so as to always have a sufficient amount of fuel for the injectors and to heat the excess fuel. The excess fuel is returned to a spool chamber 40 forming a portion of the bore 28. When the fuel in the thermostat chamber is cold, a spool 46 is in the position shown in FIG. 2 in which all flow of fuel from the spool chamber 40 to the bore 24 is by way of port 48, and bypass port 50 in the valve body is closed off by bottom head 52 of the spool 46 so that all of the heated return fuel is supplied to the feed line 36 without returning to the tank 16.

If the ambient temperature is such that the fuel in either or both the return line 42 and the tanks 14 and 16 causes the temperature in the thermostat chamber to be above that desired, about 105° F., plunger 54 of the thermostat 30 pushes downward on top head 56 (FIG. 2) of the spool 46, the top head 56 being provided with a socket 58 to receive tip 60 of the thermostat's plunger 54. As the thermostat 30 so expands, the bottom head 52 of the spool 46 partially opens the lower port 50 and the top head 56 partially closes port 48. When the ambient temperature is quite hot so that the temperature of the fuel in the thermostat chamber is about 105° F., maximum expansion of the thermostat 30 occurs and the thermostat forces the spool 46 downward against the action of the spring 62 to the position shown in FIG. 3 in which the upper port 48 is fully closed to recycling and the lower port 50 is fully open to cause the excess fuel oil to pass through check valve 64 and bypass line 66 into the tank 16 at a point which is quite remote from the inlet of the line 20. The spring 62 is retained at its upper end in a recess 68 in the bottom head 52 of the spool and in a socket 70 at the bottom of the spool chamber 40.

The thermostatically controlled flow divider valve 12 maintains the desired fuel temperature at all times by recycling to raise the temperature or bypassing directing it back to tank to cool the temperature. The thermostat shown is a commercially available thermostat known as a vernatherm.

EMBODIMENT OF FIGS. 4-7

A diesel heat mixer 80 forming an alternate embodiment of the invention has a temperature responsive flow divider valve 82. A fuel pump 83 of an engine 85 draws fuel from tank 84, which is connected by a crossover pipe 18 to a similar tank 86, both of which are mounted by brackets to a truck frame (not shown). The fuel flows from tank 84 to the valve 82 by supply line 88 entering port 90 in valve body 91 into horizontal bore 92, passing around thermostat 30 retained by plug 33 screwed into tapped bore 94. The fuel to the engine leaves the valve 82 through a feed line and travels through fuel and water separator 34 by way of feed line 98. Line 100 connects the separator to the engine fuel pump 83 and injectors of the engine 85.

A return line 42 carries the surplus return fuel from a heat exchanging portion (not shown) of the engine to return port 102 and into spool chamber 104 of the flow divider valve 82, the return fuel being heated by the engine as is well known in the art. At the cold extreme operating position of the spool 46, the bypass port 50 is closed off by bottom head 52, and the upper port 106 is open to cause all the heated return fuel to flow from the chamber 104 to a confined mixing zone 108 in tank 84 through line 110. The heated return fuel 110 connects to a return tube 111 forming part of a standpipe assembly 112 mounted at a sealed opening 114 in the fuel tank 84. As can be seen in FIG. 7, the discharge end 116 of the return tube 111 is adjacent a standpipe tube 118 so that the fuel confined between closely spaced baffles 120 will be heated before being drawn out through tube 118 by the pump. The discharge end is directed upwardly and away from the inlet end of the standpipe so that gas bubbles rise on up to the top of the fuel in the tank and pass out of the fuel.

If the ambient and/or engine temperature rises, the temperature of the feed line fuel around the thermostat 30 rises, and the thermostat expands to move the spool 46 downwardly to restrict flow from the chamber 104 to the mixing zone and open somewhat the port 50 to bypass line 124. At high ambient and engine temperatures such as to cause the fuel at the thermostat to be at the maximum temperature desired, for example, over about 105° F., the thermostat 30 positions the spool 46 at the extreme shown in FIG. 6 in which the lower port 50 is fully open and the port 106 is fully closed. This action causes the fuel to be bypassed from the mixing zone by way of line 124, which enters the tank 86 at a point most remote from the mixing zone. The thermostatically controlled flow divider 82 and piping system provide a very close temperature control on feed line fuel to the engine thereby gaining the maximum efficiency from the equipment and preventing freezing.

The standpipe assembly 112 includes a cover plate 141 to which the tube 111 and the standpipe 118 are brazed, and the cover plate is either bolted to the tank 84 with a gasket or welded thereto. The discharge end portion 116 of the return tube 111 is brazed to the standpipe 118 for rigidity and a brace 143 is provided.

Occasionally there is a tendency for gas bubbles to form in the heated return fuel, particularly at high ambient temperatures, and it is desirable to remove these bubbles from the fuel being supplied to the engines. This is effected in the heat mixer of FIGS. 4 to 7 by having the discharge end 116 of the return tube 111 directed upwardly away from the suction end of the standpipe 118. The bubbles then move up to the top of the tank and escape. For the diesel heat mixer of FIGS. 1-3, the gas bubbles are removed by mounting the valve 12 in an inverted position from that shown, thus permitting the gas bubbles to escape past end 52 of the spool and travel into the tank 16 and be vented.

EMBODIMENT OF FIGS. 8-10

A diesel fuel mixer 160 forming an alternate embodiment of the invention includes a temperature responsive flow divider valve 162 like the flow divider valve 82 and secured by capscrews to a U-shaped bracket 163 welded to a bell housing 164 of a reversible fuel tank 165 secured by a strap 166 at one side of an engine 167. A fuel pump 171 draws fuel from the tank 165, which is connected to a tank 172 identical to the tank 165 by a crossover line 173. The fuel flows from the tank 165 to the valve 162 through a supply line 174. The fuel to the fuel pump of the engine 167 leaves the valve 162 through a feed line 176 and travels through a fuel and water separator 178.

A return line 180 carries heated surplus fuel from the engine 167 to the valve 162. At the cold extreme operating condition of the valve 162, all the fuel is supplied through a line 181 and an upwardly directed nozzle 182 to a mixing zone 183 formed by a belled, perforated baffle 184 in the tank 165 near the belled housing 164. Heated fuel from the mixing zone is supplied to the valve 162 through line 186 and travels through the valve to the line 176. The line 186 is connected to a fitting 188 opening into the lower part of the tank 165 and the nozzle 182 is directed away from the inlet of the line 186.

During the hot weather operation, the valve 162 connects the return line 180 to the line 173 to direct all the heated return fuel to a port 190 in a belled housing 192, an unbaffled end of the tank 172, and fuel is supplied from the tank 172 to the tank 165 through a fitting 194 and a crossover line 196 to an inlet fitting 198 in the belled housing 164. In this instance, the heated, return fuel is mixed with the entire content of the tank 172 and the resulting mixture is directed under the baffle 182 to further cool the fuel supplied to the engine through the lines 186 and 176.

The belled housings or ends 164 and 192 of the tanks 165 and 172 (FIGS. 8 and 9) are identical with the three fittings 182, 188 and 190 in each end being identical to the corresponding fittings in the other end of each tank so that only one type of belled housing is made for both ends of each tank. The third fitting 198 of the belled housing 192 is plugged.

EMBODIMENT OF FIG. 11

A diesel fuel mixer 210 forming an alternate embodiment of the invention has a temperature responsive flow divider valve 212 like the flow divider valve 82 (FIGS. 4-6) and tanks 214 and 216 like the tank 165 and mounted on opposite sides of engine 217. The tank 214 has its restricted mixing zone adjacent belled housing 218 on which the valve 212 is mounted, and unused fittings 220 and 222 in belled housing 224 are plugged. A crossover line 226 is connected to outlet fittings 228 of the tank 216 and inlet fitting 230 of the tank 214. Return line 232 supplies heated surplus fuel from the engine to the valve 212 like the action of the line 42 (FIG. 4). Line 234 (FIG. 11) corresponds to the line 110 (FIG. 4) and lines 236 and 238 (FIG. 11) correspond to lines 88 and 98 (FIG. 4), respectively. The operation of the mixer 210 (FIG. 11) is identical to that of the mixer 80 (FIG. 4) except for the use of injection nozzle 240 (FIG. 11) which is directed away from fittings 230 and 242 into the confined heating zone.

I claim:
1. In a diesel heat mixer,
fuel tank means containing cool fuel and having a confined mixing zone,
a first inlet remote from the confined mixing zone,
a second inlet at the confined mixing zone and an outlet from the confined mixing zone,
a feed line connected to the outlet of the fuel tank means for supplying fuel to a diesel engine,
return line means carrying unused, heated fuel from the engine, and temperature sensitive proportioning valve means responsive only to the temperature of the fuel at the inlet of the feed line for dividing flow of the return line between the first and second inlets of the fuel tank means, and directing flow of fuel from the outlet of the fuel tank means to the feed line,
the valve means having a body having a chamber, a tank inlet port from the outlet of the tank means connected by a passage to a feed line port connected to the feed line, a by-pass port from the chamber connected to the first inlet of the fuel tank means, a return line inlet port connected to the chamber and a second port extending from the chamber to the second inlet of the fuel tank means,
the valve means also including a valve member adjustable in the valve body from a first extreme position opening the second port and closing the by-pass port and a second extreme position closing the second port and opening the by-pass port,
the valve means also including a thermally actuated member in the passage to the feed line for moving the valve member between the first and second positions.

2. In a diesel heat mixer,
fuel tank means containing cool fuel,
means defining a confined mixing zone in the tank means,
the fuel tank means having a first inlet remote from the confined mixing zone, a second inlet at the confined mixing zone and an outlet at the confined mixing zone,
a feed line for supplying fuel to a diesel engine,
return line means carrying unused, heated fuel from the engine,
and temperature sensitive proportioning valve means responsive only to the temperature of the fuel at the inlet of the feed line for dividng flow of the return line between the inlets of the fuel tank means and directing flow of fuel from the outlet of the fuel tank means to the feed line,
the temperature sensitive proportioning valve means including a valve body having a chamber connected by separate ports to the first and second inlets of the fuel tank means and also including a valve member movable in the chamber between first and second extreme positions,
the valve body including a feed line passage separate from the chamber and connected at one end to the outlet of the tank means and at the other end to the feed line,
the valve body also having a by-pass port connected to the first inlet of the tank means and to the chamber and closed from the chamber by the valve member when the valve member is in the first position thereof and fully open to the chamber when the valve member is in the second position thereof,
the valve body also having a return line port continuously connecting the return line to the chamber,
the valve body also having a recycling port connected to the second inlet of the fuel tank means and open to the chamber when the valve member is in the first position thereof and fully closed to the chamber when the valve member is in the second position thereof,
a line connecting the mixing zone to the feed line passage,
and a line connecting the recycling port to the mixing zone.

3. In a diesel heat mixer,
tank means containing fuel and including means creating a confined mixing zone for heated fuel and cool fuel in the tank means and having a first inlet remote from the mixing zone, a second inlet at the mixing zone and an outlet at the mixing zone,
feed line means having an inlet under suction supplying fuel to a diesel engine and connected to the outlet of the tank means,
a return line carrying unused, heated fuel from the engine,
a flow divider valve body connecting the return line to the inlets of the tank means,
a valve member movable in the valve body for dividing flow from the return line between the inlets of the tank means,
and actuating means responsive to the temperature of fuel in the feed line for moving the valve member in the valve body.

4. The diesel heat mixer of claim 3 wherein the outlet of the tank means is a standpipe.

5. The diesel heat mixer of claim 3 including a cover sealed to the tank means and carrying the second inlet and the outlet.

6. The heat mixer of claim 5 wherein the outlet comprises a standpipe and the second inlet comprises a tube having a U-shaped lower portion having a discharge portion directed upwardly.

* * * * *